United States Patent

[11] 3,581,938

| [72] | Inventors | Gerald Hartz<br>Henrico County;<br>James L. Hutcheson, Richmond, Va. |
|---|---|---|
| [21] | Appl. No. | 773,565 |
| [22] | Filed | Nov. 5, 1968 |
| [45] | Patented | June 1, 1971 |
| [73] | Assignee | Reynolds Metals Company<br>Richmond, Va. |

[54] METHOD OF AND APPARATUS FOR INITIATING THE DISCHARGE OF A FOOD PRODUCT FROM A HOPPER CONTAINER
8 Claims, 3 Drawing Figs.

[52] U.S. Cl. .................................................. 222/1, 222/196
[51] Int. Cl. .................................................. B67b 7/00, B67g 3/12
[50] Field of Search.......................................... 222/246, 196; 259/113, 112, 47

[56] References Cited
UNITED STATES PATENTS

| 2,042,739 | 6/1936 | Smith | 222/246 |
| 3,079,993 | 3/1963 | Sweet | 259/113X |
| 3,166,222 | 1/1965 | Schrader | 259/113X |

*Primary Examiner*—Stanley H. Tollberg
*Assistant Examiner*—Hadd S. Lane
*Attorney*—Glenn, Palmer, Lyne, Gibbs & Thompson

ABSTRACT: In order to overcome the tendency of a food product from clogging in a funnel-shaped bottom discharge opening, a hollow cylindrical or tubular flow control member has its lower end positioned substantially immediately above a trap door closure member for a hopper container. Immediately after opening the trap door, the tubular control member is raised thereby creating a pocket or volumetric void which facilitates discharge of a food product within the container. In the preferred form, the tubular flow control member telescopes within itself, and the hopper container is elevated with respect to the ground and is made portable.

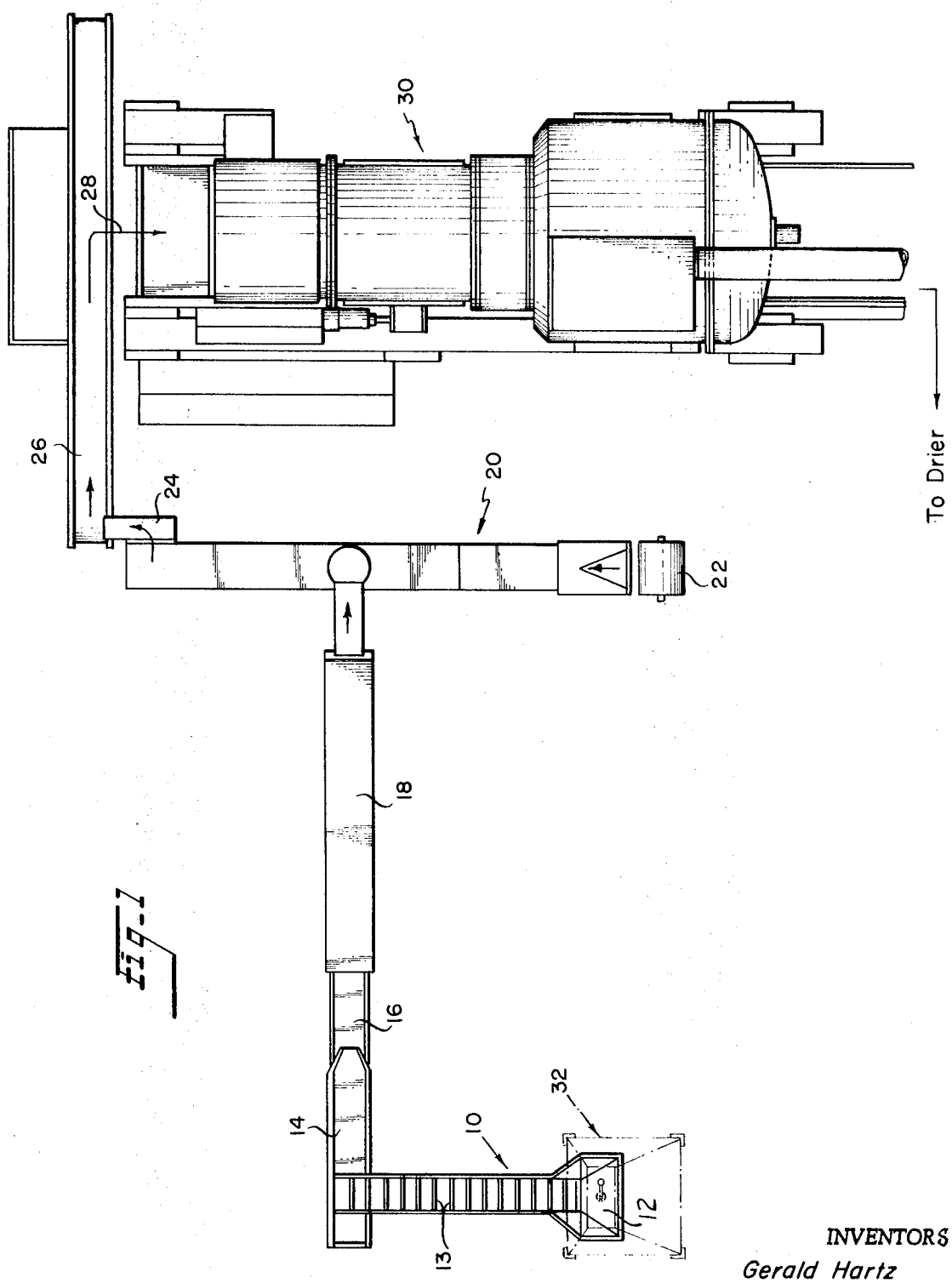

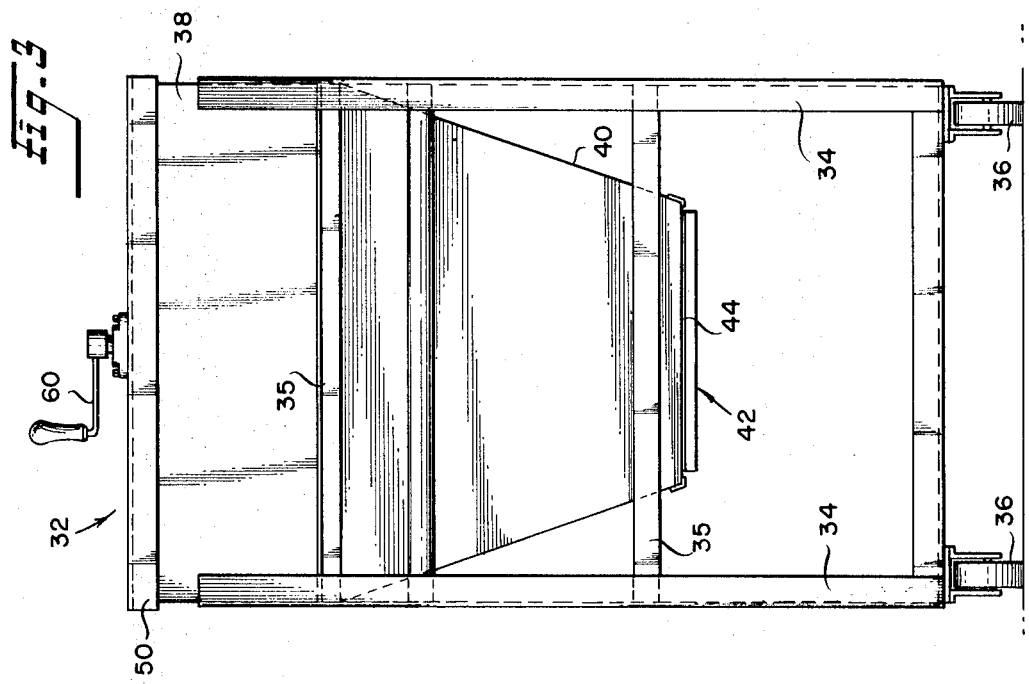
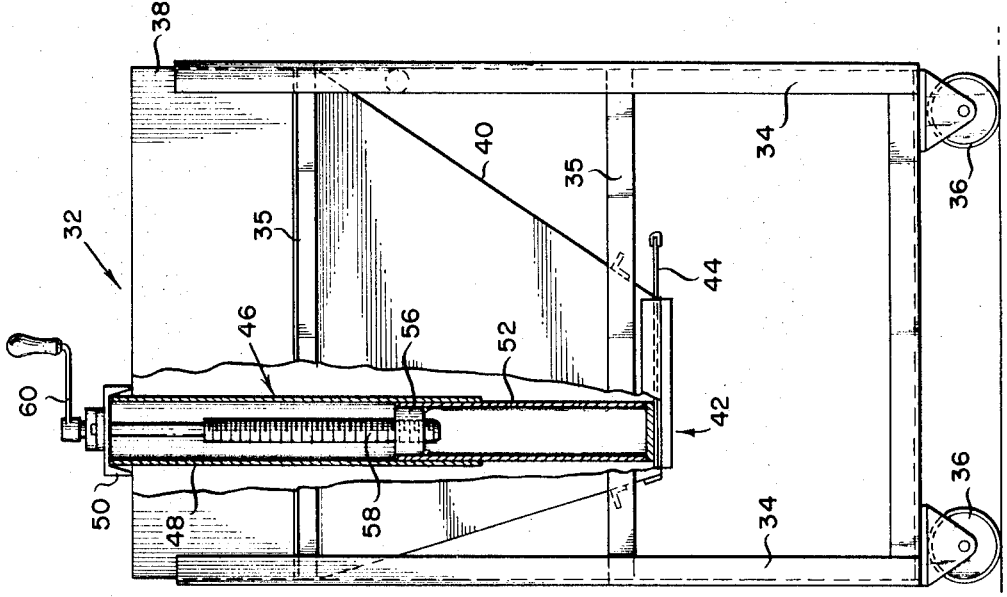
INVENTORS
Gerald Hartz
James L. Hutcheson
BY *Glenn, Palmer, Lyne, Gibbs & Thompson*
ATTORNEYS

METHOD OF AND APPARATUS FOR INITIATING THE DISCHARGE OF A FOOD PRODUCT FROM A HOPPER CONTAINER

This invention relates to flow control from hopper containers, and more particularly, to the flow control of a food product from a funnel-shaped bottom discharge of a hopper container.

With the advent of packaging of food products in flexible pouch materials has come the need for handling the food products themselves more efficiently. Specifically, the food product is washed, dried, blanched and otherwise prepared on a table prior to being packaged. The food product must be transported from the preparation table and taken to be packaged such as in an automatic handling and packaging means where the food is packaged in pouches, cooked in a steam retort and then dried preparatory to being packed in cartons for final shipment.

The present invention is primarily concerned with means for taking the semiprepared, uncooked food from the food preparation table to the means for handling and packaging the food automatically and for ensuring that the food is fed evenly and smoothly from the hopperlike container used to transport the food.

In previously existing hopper discharge containers there has been a tendency for the food product to clog at the bottom discharge end of the hopper, thereby resulting in a discontinuity in the travel of food in the overall process and resulting in intermittent operation of the packaging means and/or cooking apparatus. This has been very detrimental to efficient operation.

In accordance with the present invention, a hopper container having a funnel-shaped bottom discharge opening and a trap door closing the bottom discharge thereof is provided with a hollow cylindrical or tubular flow control member, one end of which is positioned substantially immediately above the trap door. Screw means are used to elevate the end of the tubular flow control member, thereby creating a pocket or void volume above the trap door to aid in the discharge of food products from the hopper when the trap door is opened.

In the preferred form of the invention the hollow cylindrical or tubular control member comprises a first tubular portion fixedly mounted with respect to the hopper and a second tubular portion capable of being telescoped within the first tubular portion. The screw means used to elevate or telescope the tubular portions of the tubular control member may be hand-operated or motor controlled.

The inherent advantages and improvements of the present invention will become more readily apparent upon considering the following detailed description of the invention and by reference to the drawings, in which:

FIG. 1 is a schematic representation of a portion of the food-packaging and processing line;

FIG. 2 is a front elevation view of the hopper discharge apparatus of this invention, with parts broken away and with a portion thereof shown in vertical cross section; and, FIG. 3 is a side elevational view of the hopper discharge apparatus of FIG. 2.

Referring now to FIG. 1 of the drawings, a conveyor mechanism is indicated generally at 10. Food to be packaged is placed on receiving platform 12 by means of the hopper container of the present invention. Elevator cleats 13 transport the food product deposited on receiving platform 12 to a vibrator mechanism 14 positioned to operate in a direction transverse to the feed of conveyor 10. The purpose of the vibrator mechanism 14 is to level off or even out the height of the batches of food deposited thereon by means of the elevator cleats 13. The vibratory mechanism is slightly inclined so that flow is from left to right in FIG. 1 onto a conveyor 16. The latter passes through a preheater 18 in which the food product is elevated in temperature prior to being introduced into a retort for ultimate cooking. From preheater 18 the food product is inserted in conventional manner into a bagmaking means such as a bagmaking machine indicated generally at 20 at which a web material schematically shown at 22 is fed in the direction of the arrow. The food product is encapsulated in pouch materials and sealed in conventional manner and the pouches are then diverted by means of transfer mechanism 24 to a conveyor 26. Thereafter the pouches are diverted in the direction of arrow 28 into a retort 30 where the food product is cooked and sterilized or pasteurized. Finally, the food products are passed to a drier where they are dried and then packed in cartons for final shipment.

Referring now to FIGS. 2 and 3 of the drawings, there is illustrated a hopper discharge container, indicated generally at 32, which is used to deposit the food products onto the receiving platform 12 in FIG. 1. The hopper discharge container 32 is shown to have suitable angle-shaped vertical support members 34 and angle-shaped horizontal support members 35 in order to support the hopper discharge container 32 above ground level. Rollers or wheels 36 are provided to make the apparatus portable. The hopper discharge container 32 is shown to have vertical upper walls 38 and a funnel-shaped lower wall 40 which leads to a bottom opening indicated generally at 42. A reciprocable trap door 44 closes the bottom opening 42.

Mounted within the hopper discharge container 32 is a tubular flow control member indicated generally at 46. The tubular flow control member 46 comprises a first tubular portion 48 which is attached to and supported by a channel-shaped mounting member 50. The tubular flow control member 46 further comprises a second tubular portion 52 which is closed by bottom closure 54. The second tubular portion 52 is provided with a threaded plug member 56 through which a threaded shaft means 58 extends so as to permit raising and lowering of the second tubular portion 52 within the first tubular portion 48 by means of a crank and handle member 60. Alternatively, a motor drive may be used to telescope the second tubular portion 52 within the first tubular portion 48. As can be seen in FIG. 2, the lower end of the second tubular portion 52 is disposed substantially immediately above the trap door 44 so that when the latter is retracted and the second tubular portion 52 immediately thereafter telescoped within the first tubular portion 48 either by means of the crank and handle member 60 or by a motor drive that a pocket of volumetric void is created immediately above the trap door 44, whereby a food product contained within the funnel-shaped lower portion of the hopper discharge container 32 may be discharged in a steady flow with the aid of the flow control member 46.

In the preferred form of the present invention, the tubular flow control member 46 is offset with respect to the bottom opening 42 so as to be nearer the closed position of reciprocable trap door 44. Therefore, it is possible to benefit from the flow enhancing properties of the flow control member 46 without fully opening trap door 44.

Because the food product will be discharged in a steady and even manner from the hopper discharge container 32, there will be not only less clogging of the food product but also less physical damage thereto.

While a presently preferred embodiment of the invention has been illustrated and described, it will be recognized that the invention may be otherwise variously embodied and practiced within the scope of the claims which follow:

What we claim is:

1. A hopper discharge apparatus comprising:
   a. a hopper container having a funnel-shaped bottom discharge opening,
   b. a trap door closing said bottom discharge opening of said hopper container,
   c. a cylindrical flow control member having one end thereof disposed substantially immediately above said trap door,
   d. and means to open said trap door and immediately thereafter elevate said one end of said cylindrical flow control member a substantial distance to a raised position and to maintain said member in said raised position thereby creating a volumetric void above said trap door to aid in the discharge of products from said hopper when said trap door is opened.

2. A hopper discharge apparatus as defined in claim 1 wherein said cylindrical control member comprises a first tubular portion fixedly mounted with respect to said hopper container and a second tubular portion capable of being telescoped within said first tubular portion.

3. A hopper discharge apparatus as defined in claim 1 wherein said means to elevate said one end of said cylindrical flow control member includes threaded shaft means which extend through a portion of said tubular flow control member.

4. A hopper discharge apparatus as defined in claim 2 wherein said means to elevate said one end of said cylindrical flow control member includes threaded shaft means which extends through said first tubular portion and engages said second tubular portion.

5. A hopper discharge apparatus as defined in claim 1 wherein said trap door is reciprocable from a closed position to an open position and wherein said cylindrical flow control member is offset in the direction of the closed position of said trap door.

6. A hopper discharge apparatus as defined in claim 1 including means for supporting said hopper container above ground level and means for transporting said hopper container from place to place.

7. A method of discharging a food product from a hopper container having a reciprocable trap door bottom closure member, said method comprising the steps of
   a. positioning an end of a cylindrical flow control member substantially immediately above said trap door bottom closure member,
   b. opening said trap door bottom closure member,
   c. and, immediately thereafter, raising the end of said cylindrical flow control member a substantial distance to a raised position and maintaining said member in said raised position thereby creating a volumetric void whereby a food product within said hopper container will flow into said void, thereby initiating flow through the bottom discharge end of said hopper container.

8. A method of discharging a food product from a hopper container having a reciprocable trap door bottom closure member as defined in claim 7 wherein said cylindrical flow control member comprises a first tubular portion fixedly mounted with respect to said hopper container and a second tubular portion slidable therein whereby said step of raising the end of said cylindrical flow control member away from said trap door bottom closure member comprises telescoping of said second tubular portion within said first tubular portion.